Dec. 3, 1940.  A. G. FEDERMAN  2,223,362
PROCESS OF RECLAIMING REINFORCING RINGS FROM TIRE BEADS
Filed April 11, 1939

INVENTOR
ALBERT G. FEDERMAN.
BY
ATTORNEY

Patented Dec. 3, 1940

2,223,362

UNITED STATES PATENT OFFICE 2,223,362

PROCESS OF RECLAIMING REINFORCING RINGS FROM TIRE BEADS

Albert G. Federman, Chester, Pa.

Application April 11, 1939, Serial No. 267,353

4 Claims. (Cl. 148—8)

My invention relates to the reclaiming of metallic parts imbedded in rubber, more particularly to the reclaiming of the metallic reinforcing rings of discarded tires, and has for an object the provision of an improved process therefor.

Tire casings have imbedded in their beads (the edges engaging the wheel rim) metallic reinforcing members in the form of endless rings, generally made of twisted wire cable, altho they may be solid rings of various cross-sections. These reinforcing rings, if reclaimed without injury, can be used in new tires and hence are worth far more than their value as scrap metal.

To the best of my knowledge no commercially practical method for reclaiming these rings has heretofore been known. Attempts have been made to separate metallic members, such as twisted wire cables, from their rubber casings, but considerable difficulty has been encountered in obtaining a clean separation of the metal from the encasing rubber.

It is, of course, possible to remove the casing by burning the same, but the high temperatures involved, particularly in the presence of air, seriously affect the physical characteristics of the metal, rendering it unfit for further use in its intended capacity.

More satisfactory results have been obtained by the use of solvents and/or chemicals, but such results are not only expensive, but are accompanied by pollution of the air, resulting in health and fire hazards.

Therefore, the primary object of my invention is the provision of a process of reclaiming metal which will not injure the latter and which is economical.

These and other objects are effected by my invention as will be apparent from the following description and claims taken in accordance with the accompanying drawing, forming a part of this application, in which:

Figure 1:
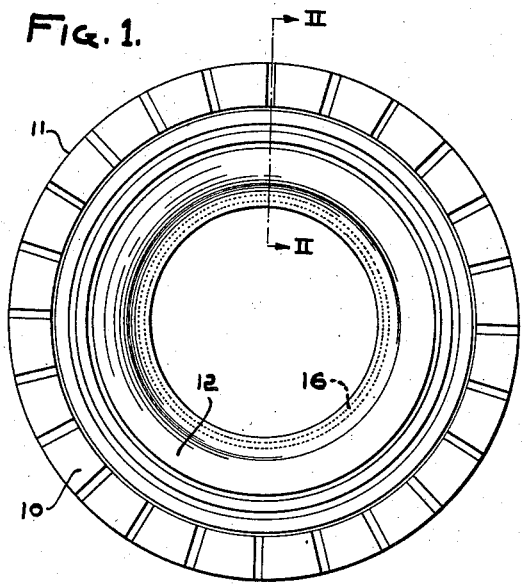
Fig. 1 is a side elevational view of a discarded auto tire, showing in dotted lines the metallic reinforcing ring which may be reclaimed by the process of my invention.

Referring now to the drawing more in detail, Fig. 1 shows, somewhat diagrammatically, a discarded auto tire casing 10, having top and side walls 11 and 12, respectively, comprised by alternate layers of fabric 13 and rubber 14. The side walls are provided, at their inner edges, with the usual beads 15 for contact with an auto wheel rim (not shown).

The beads 15 are provided with metallic reinforcing rings 16, preferably comprised by endless wire cables formed of a plurality of smaller wires 17, twisted together. These wires are carefully united, as by welding or splicing at their meeting ends, to provide the endless cable 16.

Figure 2:
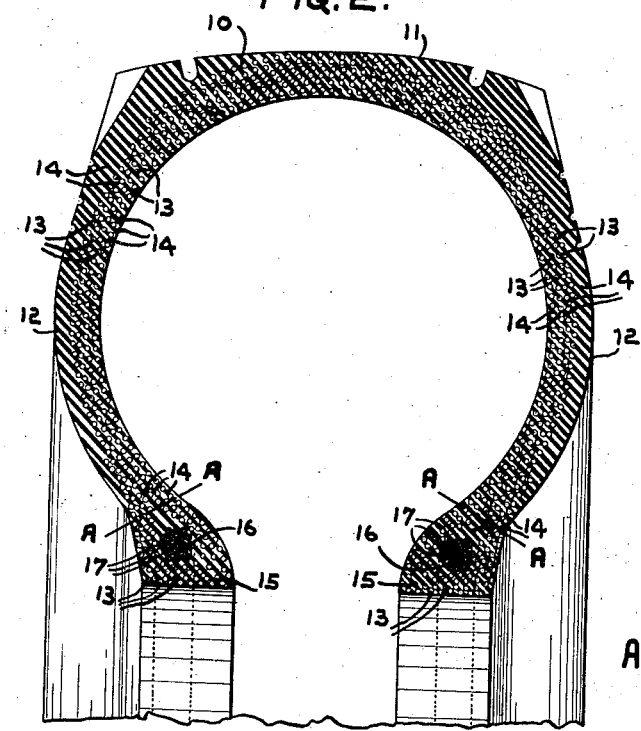
Fig. 2 is a transverse sectional view, taken along the line II—II of Fig. 1.
Figure 3:
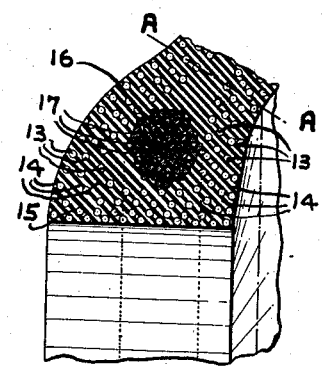
Fig. 3 is an enlarged fragmentary view of one of the reinforced beads shown in Fig. 2; and, Fig. 4 is a perspective view of a piece of rubber-insulated wire cable, indicating a further field of use for my invention.

In practicing my invention, I prefer to separate the beads from the remainder of the tire casing, as by cutting along the dot-dash line A—A of Figs. 2 and 3. The beads are then placed in an autoclave of any desired construction. Preferably, the latter is such that a large number of beads may be placed therein with as little waste of space as possible. Sufficient liquid, preferably water, is put in the autoclave to cover all of the beads therein, after which the apparatus is subjected to a temperature within a range which I have determined to be suitable and at the pressure necessary to maintain the liquid as such at the temperature selected. The presence of the water not only prevents burning or carbonization of the rubber onto the surface of the metal ring, but also aids in the separation of the metal ring from the rubber when they are removed from the autoclave.

I have found that temperatures less than 245° C. fail to produce the desired results unless maintained for an excessive period of time. The best results are attained at and above a temperature of 252° C., with the corresponding pressure necessary to maintain the liquid as such at that temperature. However, satisfactory results may be obtained with temperatures as high as 360° C. Within the range of 245° C. to 260° C. the rubber and fabric are changed to a hard carbonized material which may be broken away from the metallic reinforcing ring, leaving the latter relatively clean. At the upper temperature range of 350° C. to 360 C. the fabric is carbonized and the rubber becomes soft and pasty, permitting ready separation of the metal ring therefrom. Between these two ranges the resulting material (the destroyed rubber and fabric) varies from hard at the lower temperatures to soft and pasty at the higher temperatures. While satisfactory results may be obtained at temperatures above 360° C., such operating conditions are not economical, commercially.

After the heating step, the beads are removed from the autoclave and the metal rings separated therefrom while the material is wet, the waste rubber being thrown away.

Figure 4:
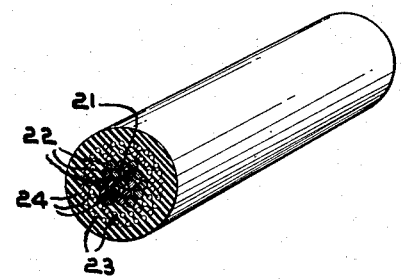

Altho my process was developed and intended for reclaiming metal reinforcing rings of auto tire beads, it should be useful in reclaiming metals in other fields of use. In this connection I have shown, in Fig. 4, a wire cable 21, comprised by a plurality of smaller wires 22 twisted together and encased in alternate layers 23 and 24 of rubber and fabric, respectively. It will be apparent that the process disclosed above can be used to reclaim such cables, as well as various other metal articles imbedded in rubber and fabric or in rubber alone.

While I have disclosed my invention as having several uses, it will be obvious to those skilled in the art that it is not so limited, but is susceptible of various other uses without departing from the spirit thereof, and I desire, therefore, that only such limitations shall be placed thereupon as are imposed by the prior art or as are specifically set forth in the appended claims.

What I claim is:

1. In the process of reclaiming metallic members from casings of rubber in which they are embedded, the step of subjecting the metallic members and their casings, while submerged in water, to a temperature within the range of 245° C. to 360° C., under a pressure which will maintain the water as such.

2. In the process of reclaiming metallic members from casings of rubber in which they are embedded, the step of subjecting the metallic members and their casings, while submerged in water, to a temperature within the range of 245° C. to 260° C., under a pressure which will maintain the water as such.

3. In the process of reclaiming metallic members from casings of rubber in which they are embedded, the step of subjecting the metallic members and their casings, while submerged in water, to a temperature within the range of 350° C. to 360° C., under a pressure which will maintain the water as such.

4. The process of reclaiming metallic reinforcing rings from tire beads which comprises submerging the beads containing the rings in water, subjecting them while submerged to a temperature within the range of 245° C. to 260° C. under such pressure as will maintain the water as such, maintaining the temperature and pressure until the beads are converted into a hard carbonized material, and removing the latter from the metallic rings.

ALBERT G. FEDERMAN.